United States Patent
Davis et al.

(10) Patent No.: US 10,534,693 B2
(45) Date of Patent: Jan. 14, 2020

(54) TEMPORARY DE-OPTIMIZATION OF TARGET FUNCTIONS IN A CLOUD DEBUGGER

(71) Applicant: MICROSOFT TECHNOLOGY LICENSING, LLC, Redmond, WA (US)

(72) Inventors: Jackson Davis, Carnation, WA (US); Nelson Mandela Billing, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 15/586,557

(22) Filed: May 4, 2017

(65) Prior Publication Data

US 2018/0322028 A1    Nov. 8, 2018

(51) Int. Cl.
*G06F 9/44*      (2018.01)
*G06F 11/36*     (2006.01)

(52) U.S. Cl.
CPC ...... *G06F 11/3644* (2013.01); *G06F 11/3624* (2013.01); *G06F 11/3636* (2013.01); *G06F 11/3664* (2013.01)

(58) Field of Classification Search
CPC .. G06F 8/443; G06F 9/45516; G06F 11/3636; G06F 11/362; G06F 11/3644; G06F 11/3624; G06F 11/3664; A63F 13/12
See application file for complete search history.

(56) References Cited

U.S. PATENT DOCUMENTS

| | | | |
|---|---|---|---|
| 7,367,023 B2 | 4/2008 | Adolphson et al. |
| 8,752,017 B2 | 6/2014 | Hossain et al. |
| 8,819,640 B2 | 8/2014 | Bates et al. |
| 9,244,817 B2 | 1/2016 | Cai et al. |
| 9,262,300 B1 | 2/2016 | Haba et al. |
| 9,436,583 B1 | 9/2016 | Chen et al. |
| 9,459,988 B2 | 10/2016 | Guan et al. |
| 2002/0100018 A1 | 7/2002 | Click et al. |

(Continued)

OTHER PUBLICATIONS

Hölzle, et al., "Debugging Optimized Code with Dynamic Deoptimization", In Proceedings of the ACM SIGPLAN conference on Programming language design and implementation, Jul. 1, 1992, pp. 32-43.

(Continued)

*Primary Examiner* — Tuan A Vu
(74) *Attorney, Agent, or Firm* — Workman Nydegger

(57) ABSTRACT

Systems and methods for processing breakpoints in a target program executing on a remotely located server computer are presented. In one embodiment, upon receiving instructions to set a breakpoint in a target program, a code block of the target program is identified in which the execution location of the breakpoint is to be set. The identified code block of the target program is re-compiled. Re-compiling the code block of the target program comprises re-compiling the code block without optimizations and including executable instructions at the execution location of the breakpoint to generate a snapshot of debugger information regarding the target program upon the breakpoint triggering. The re-compiled code block is then bound in the target program.

20 Claims, 6 Drawing Sheets

(56) References Cited

U.S. PATENT DOCUMENTS

| | | | | |
|---|---|---|---|---|
| 2002/0144241 | A1* | 10/2002 | Lueh | G06F 9/45516 717/136 |
| 2003/0149961 | A1* | 8/2003 | Kawai | G06F 11/3624 717/129 |
| 2004/0083459 | A1* | 4/2004 | Roediger | G06F 8/443 717/130 |
| 2005/0066314 | A1 | 3/2005 | Bates et al. | |
| 2006/0064676 | A1 | 3/2006 | Chavan | |
| 2008/0127035 | A1 | 5/2008 | Lev et al. | |
| 2008/0244537 | A1 | 10/2008 | Wintergerst et al. | |
| 2009/0100353 | A1* | 4/2009 | Cradick | A63F 13/12 715/757 |
| 2009/0187884 | A1 | 7/2009 | Kryka et al. | |
| 2011/0078666 | A1 | 3/2011 | Altekar | |
| 2012/0005659 | A1 | 1/2012 | Bonanno et al. | |
| 2012/0304155 | A1* | 11/2012 | Golan | G06F 11/362 717/129 |
| 2012/0331449 | A1* | 12/2012 | Farchi | G06F 11/3644 717/129 |
| 2013/0263094 | A1* | 10/2013 | Bates | G06F 11/3636 717/129 |
| 2015/0052403 | A1 | 2/2015 | Garrett et al. | |
| 2015/0143344 | A1 | 5/2015 | Davis | |
| 2016/0124728 | A1* | 5/2016 | Mahaffey | G06F 8/443 717/158 |
| 2016/0124835 | A1 | 5/2016 | Davis | |

OTHER PUBLICATIONS

Hines, et al., "Using De-optimization to Re-optimize Code", In Proceedings of the 5th ACM international conference on Embedded software, Sep. 19, 2005, 10 pages.

"How to: Debug Optimized Code", https://msdn.microsoft.com/en-us/library/606cbtzs.aspx, Retrieved on: Apr. 10, 2017, 2 pages.

Elms, Kim., "Debugging Optimised Code Using Function Interpretation", In Proceedings of the 3rd International Workshop on Automatic Debugging, Sep. 10, 1997, 10 pages.

"What's New for the Debugger in Visual Studio 2017—Visual Studio Microsoft Does", Retrieved from: https://docs.microsoft.com/en-us/visualstudio/debugger/what-s-new-for-the-debugger-in-visual-studio?view=vs-2017, Jan. 22, 2018, 01 Page.

Irani, Romin, "GCP Stackdriver Tutorial : Debug Snapshots, Traces, Logging and Logpoints", Retrieved from: https://rominirani.com/gcp-stackdriver-tutorial-debug-snapshots-traces-logging-and-logpoints-1ba49e4780e6, Jun. 14, 2016, 36 pages.

"International Search Report and Written Opinion Issued in PCT Application No. PCT/US18/026775", dated Jul. 20, 2018, 18 Pages.

"International Search Report and Written Opinion Issued in PCT Application No. PCT/US18/026776", dated Jul. 20, 2018, 13 Pages.

"Stackdriver Debugger", https://cloud.google.com/debugger/, Retrieved on: Mar. 9, 2017, 5 pages.

Taylor, Dan, "Performance and Diagnostic Tools in Visual Studio 2015", https://blogs.msdn.microsoft.com/visualstudioalm/2015/07/20/performance-and-diagnostic-tools-in-visual-studio-20151, Published on: Jul. 20, 2015, 17 pages.

"AWS X-Ray Developer Guide", http://docs.aws.amazon.com/xray/latest/devguide/xray-guide.pdf, Retrieved on: Mar. 9, 2017, 94 pages.

"AWS X-Ray (preview)", https://aws.amazon.com/xray/, Retrieved on: Mar. 9, 2017, 7 pages.

Archer, et al., "Debugging an Azure cloud service or virtual machine in Visual Studio", https://docs.microsoft.com/en-us/azure/vs-azure-tools-debug-cloud-services-virtual-machines, Published on: Nov. 11, 2016, 22 pages.

Sigelman, et al., "Dapper, a Large-Scale Distributed Systems Tracing Infrastructure", In Google Technical Report dapper-2010-1, Apr. 2010, 14 pages.

Grabner, Andreas, "Tracing is the new Debugging in Distributed App Development", https://www.dynatrace.com/blog/tracing-is-the-new-debugging-in-distributed-app-development/, Published on: Dec. 13, 2016, 14 pages.

"Non Final Office Action Issued in U.S. Appl. No. 15/586,593", dated Feb. 21, 2019, 12 Pages.

"Final Office Action Issued in U.S. Appl. No. 15/586,593", dated May 23, 2019, 14 Pages.

"Non-Final Office Action Issued in U.S. Appl. No. 15/586,593", dated, Sep. 27, 2019, 18 pages.

* cited by examiner

TEMPORARY DE-OPTIMIZATION OF TARGET FUNCTIONS IN A CLOUD DEBUGGER

CROSS-REFERENCE TO RELATED MATTER

This matter is related to co-pending and commonly-assigned U.S. patent application Ser. No. 15/586,593, entitled "Conditional Debugging of Server-Side Production Code," filed May 4, 2017, which is incorporated herein by reference.

BACKGROUND

A debugger is a computer-executable tool which enables a programmer to monitor the execution of a target program. Generally, a debugger can enable a program to be run step by step (called stepping) according to encoded instructions/code of a programmer, to stop at a particular line of code when a breakpoint is encountered, and can enable the value of variables to be inspected when the program is at a breakpoint or while the program is running (inspection). Some debuggers can also allow a programmer modify a target program's state data while the program is in execution (though typically stopped at a breakpoint), in addition to observing and reporting on the target program's state. Some debuggers can display and navigate the execution stack, enabling the programmer to skip over parts of code while stepping, or to restart the execution from a potentially arbitrary line of code. Other functions of debuggers include listing and debugging multiple threads at the same time, enabling hit counting, and the like.

Traditionally, though not exclusively, a debugger executes on the same computer as the target program. However, when the target code is server-side code (code operating on a remotely located computer), traditional debuggers cannot be employed. Indeed, debugging server-side code is a complex and difficult challenge. The reasons for this are many. As indicated, server-side code typically resides on a remotely-located computer, rather than on the programmer's computer where the programmer's debugger is also executing. This remoteness creates debugging issues in regard to actual examination of executing code and current program state information. Additionally, server-side code typically operates as a process that services multiple users and/or requests. Typical debugging involves setting breakpoints within the target program, i.e., points in the program where execution will be suspended while active execution will transfer to the debugger, allowing the programmer, via the debugger, to examine program execution state. However, when the target code and the debugger are executing remotely, such close interaction between the two (target program and debugger) is, at best, challenging.

Still further, with server-side code, at any one moment, any given function or module within the server-side code (i.e., a server-side target program) may be executing on multiple threads from multiple parties. Simply suspending execution of a server-side target program when a breakpoint is "hit," which program is designed to service multiple users, will cause all users to pause—a very undesirable result. Moreover, a single breakpoint may be hit by multiple parties based on various execution conditions. Quite literally, generating breakpoint data each time a breakpoint is encountered in a server-side program operating "under load" (i.e., the simultaneous execution of the same, server-side code of multiple threads from multiple parties) generates an indecipherable, logistical quagmire of debugging data that requires substantial effort to sort out according to which set of breakpoint data belongs to which logical execution context. In short, when applying traditional debugging techniques to a server-side target program executing under load, the results require substantial time to sort out, and execution of the target program stops.

In spite of the many challenges to debugging server-side code, being able to effectively and efficiently debug server-side code, under load, is invaluable in high quality, error free, executable code that operates as a server-side service.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods for processing breakpoints in a target program executing on a remotely located server computer are presented. In one embodiment, upon receiving instructions to set a breakpoint in a target program, a code block of the target program is identified in which the execution location of the breakpoint is to be set. The identified code block of the target program is re-compiled. Re-compiling the code block of the target program comprises re-compiling the code block without optimizations and including executable instructions at the execution location of the breakpoint to generate a snapshot of debugger information regarding the target program upon the breakpoint triggering. The re-compiled code block is then bound in the target program.

According to additional aspects of the disclosed subject matter, a method for processing a breakpoint request regarding a target program is presented. Breakpoint information is received from a computer user in regard to an execution location in a target program that executes on a computing device. The breakpoint information identifies a breakpoint to set as a first breakpoint. A code block of the target program that includes the execution location of the first breakpoint is identified. The identified code block of the target program is re-compiled and, particularly, re-compiled the code block of the target program comprises re-compiling the code block without optimizations, and including executable instructions at the execution location to generate a snapshot of debugger information regarding the target program upon the breakpoint triggering. The re-compiled code block is bound or linked into the target program.

According to other aspects of the disclosed subject matter, a computer-readable medium bearing computer-executable instructions, for carrying out a method for processing a breakpoint, is presented. Breakpoint information is received from a computer user in regard to a first breakpoint in a target program. The breakpoint information identifies the execution location in the target program of the first breakpoint. A code block of the target program is identified, where the code block includes the execution location of the first breakpoint. The identified code block is re-compiled, such that code block is re-complied without optimizations and includes executable instructions at the execution location to generate a snapshot of debugger information regarding the target program upon the first breakpoint triggering. The re-compiled code block is then bound or linked into the target program.

According to still additional aspects of the disclosed subject matter, a computer device for processing breakpoint requests is presented. The computer device includes a processor and a memory, where the processor executes instructions stored in the memory as part of or in conjunction with one or more additional executable components of the computing device. In execution, these components configure the computer device to receive an atomic set of breakpoints from a computer user. The atomic set of breakpoints identifies one or more breakpoints to be set in a target program, where each of the one or more breakpoints corresponds to an execution location in the target program. For each of the one or more breakpoints of the atomic set of breakpoints, a code block of the target program is identified, where an identified code block includes the execution location of a corresponding breakpoint. Each of the identified code blocks of the target program are re-compiled in a matter that code block does not include optimizations and includes executable instructions at the execution location of a breakpoint to generate a snapshot of debugger information regarding the target program upon the breakpoint triggering. The re-compiled code blocks are then bound into the target program.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
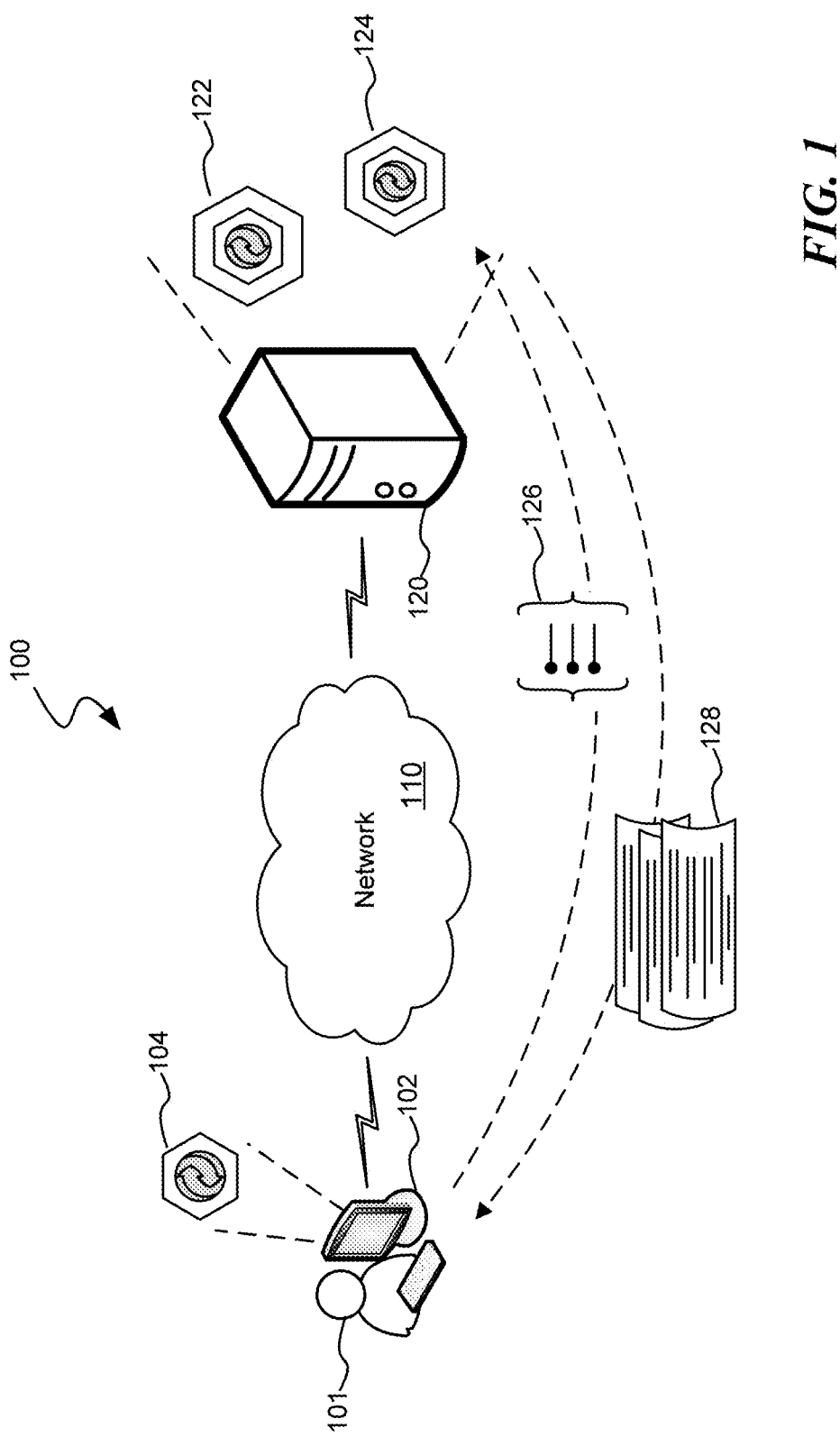
FIG. 1 is a block diagram illustrating an exemplary network environment suitable for implementing aspects of the disclosed subject matter.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

By way of further definition, "debugger code" (a version of a target program that is intended to be used by a debugger) includes symbols and data, debugging routines, etc. to facilitate debugger execution. Typically, debugger code is not optimized code. In contrast, "production code" refers to an executable version of the target program that is stripped of debugger artifacts (symbols, tables, debugger routines, etc.) and that is intended for actual use. Server-side production code, then, is production code that is intended for use as a server-side program—a target program executing on a remotely located computer and accessible by way of a network.

Traditionally a breakpoint refers to a location in a program at which the execution of the program is interrupted or suspended. This is a blocking breakpoint. In other words, the target program executes in its logical flow until a breakpoint is encountered, at which point execution of the target program is blocked/suspended and control is delivered to the programmer's debugger. However, by way of definition and for purposes of this document, unless specifically and otherwise qualified in the document, the term "breakpoint" refers to a non-blocking breakpoint, i.e., a location of execution within the target program at which (upon encountering the location during execution) a debugger action is taken. As will be discussed in greater detail below, this debugger action is generation of a snapshot of program information at the time that execution reached the breakpoint location. Additionally, a "conditional breakpoint" is a breakpoint that is triggered (i.e., a snapshot is generated) upon the satisfaction of the conditional criteria associated with the breakpoint.

Regarding the term "non-blocking" when used herein in describing a breakpoint, in one embodiment of the disclosed subject matter, the executing thread is temporarily redirected from the target program for purposes of generating the snapshot of program data/information. Upon completion of the snapshot, execution automatically resumes from the point of redirection. In an alternative embodiment of the disclosed subject matter, upon encountering a breakpoint, execution of that thread is temporarily suspended for purposes of generating the snapshot of program information, after which execution of the thread automatically resumes from the point of suspension. In both embodiments, the generations of the snapshot of program information is non-blocking because execution is not stopped pending external input (e.g., an instruction to resume by the programmer.) Moreover, in most implementations, the amount of time consumed in generating the snapshot of program information is anticipated to be 10 ms of time or less, such that the extra time needed to generate the snapshot goes largely undetected and unnoticed. The term "non-invasive" in regard to debugging of a server-side target program means that the state of the target program's execution stack and/or memory stack are not affected by debugger activities, particularly in regard to generating the snapshot of the target program's data and execution state.

The term "atomic set of breakpoints" refers to a related set of breakpoints, related in the sense that the same condition applies to and triggers each of the breakpoints within the atomic set. Thus, if a programmer were to apply a set of breakpoints to a target program, the condition that triggers a first breakpoint within that atomic set would be the same condition that triggers a second breakpoint within that atomic set.

In regard to the execution of a target program, those skilled in the art will appreciate that a first thread of execution of the target program may cause one or more additional threads to execute. Further still, chaining between a first and second execution thread, where a first logical thread of execution terminates but logical execution of the target program continues in a second thread, may occur for a given target program. Thus, by way of definition and for purposes of the disclosed subject matter, because the execution of a target program by a user may cause multiple threads of execution to occur, including simultaneously, the collective execution of these threads should be viewed as a "logical execution context" or, more simply, an "execution context." Additionally, a logical execution context relates to the user causing the execution by way of a "context identifier." In various embodiments, a context identifier may correspond to a session identifier that is generated when accessing a remotely executing service/program. Of course, any number other identifiers may be used as a context identifier such as, by way of illustration and not limitation, a user name, a universal resource identifier (URI), and the like.

Recent advancements in server-side debugging allow for non-blocking, non-invasive debugging of server-side production code. Unfortunately, while debugging server-side production code may be non-blocking and non-invasive, setting a breakpoint within the server-side target program, when used under load by multiple parties, still generates the near-indecipherable morass of debugging data, which requires substantial effort to sort and process. According to aspects of the disclosed subject matter and as will be discussed in greater detail below, providing conditional breakpoints in a target program allows for the extraction of debugging snapshots with regard to a single logical execution content. As will be readily appreciated, this allows for production code to operate under load and generate debugging snapshots with regard to a single logical execution context.

Turning to the figures, FIG. 1 is a block diagram illustrating an exemplary network environment 100 suitable for implementing aspects of the disclosed subject matter. The exemplary network environment includes one or more user computers, such as user computer 102, connected to a server computer 120 by way of a network 110. By way of illustration, a programmer/user 101 utilizing user computer 102 executes a debugger 104 in regard to a server-side program 122 operating on server computer 120. As mentioned above, the server-side program, i.e., the target program, operates as production code and may also be operating under load.

As will be discussed, additionally, below, also operating on the server computer 120 is a debugging module 124. In operation, the programmer 101 issues a set of breakpoints 126, an atomic set of breakpoints, to the debugging module 124. Each of the breakpoints in the atomic set of breakpoints is associated with a condition. This condition, upon being met during execution, cause the breakpoint to "fire," as will be described below.

According to aspects of the disclosed subject matter, a condition associated with an atomic set of breakpoints may include a variety of factors, including (by way of illustration and not limitation), a domain of the requesting party (i.e., the programmer 101), a specific context identifier, the type of request that caused execution of the server-side program, demographic information regarding the requesting party, load information in regard to the server-side program and/or server computer, and the like.

For its part, the debugger module 124 receives the atomic set of breakpoints, identifies the various code segments within the target, server-side program 122, and for each of the breakpoints, "sets" a conditional breakpoint, each breakpoint being conditioned upon the same condition. According to the nature of the breakpoints and as will be appreciated by those skilled in the art, the target, server-side program triggers a breakpoint when execution of the target program encounters the corresponding execution point. Unlike typical breakpoints that suspend execution of the target program for the programmer to take whatever debugging action is desired, according to aspects of the disclosed subject matter, when a breakpoint is encountered and the conditions for the breakpoint are satisfied, a snapshot of program information is generated and execution of the target program continues. A snapshot of program information may include stack/heap information describing values and variables and their current states, program stack information that describes the current execution path leading up to the breakpoint location, and the like. While generating a snapshot of program information certainly involves processor time, typical processing time typically is 10 ms or less, which is largely undetectable by most people and in most circumstances.

After the snapshot is generated and execution of the target program is continued, the snapshots, such as snapshot 128, are transferred back to the debugger 104 such that the programmer may utilize the information in performing any debugging tasks. Advantageously, breakpoints are triggered only upon meeting the conditions of the breakpoints, particularly the execution context conditions. This not only limits the triggering of breakpoints to a specific party (or a specific set of parties that satisfy the execution context conditions), but has minimal processing impact on execution of the target program for those logical contexts that do not satisfy the conditional criteria.

Figure 2:
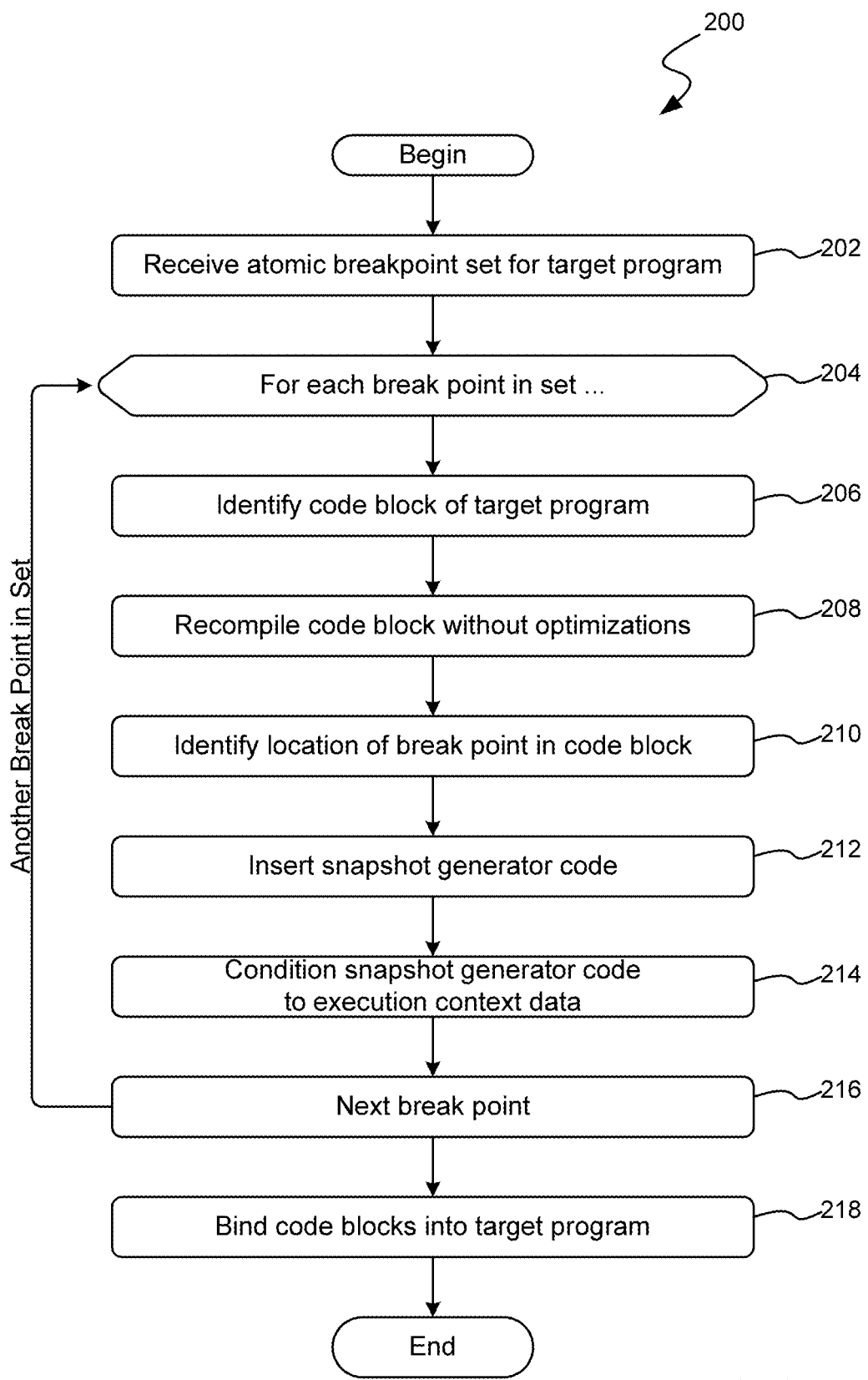
FIG. 2 is a flow diagram of an exemplary routine 200 for setting breakpoints in a target program, conditioned according to logical execution context information.

Turning now to FIG. 2, FIG. 2 is a flow diagram of an exemplary routine 200 for setting breakpoints, conditioned according to logical execution context information, in a target program. Beginning at block 202, an atomic set of breakpoints, such as atomic set 126, is received in regard to the target program. In addition to simply identifying breakpoint locations in the target program, the received information also includes conditional information, i.e., the condition upon which the breakpoints of the atomic set will trigger.

At block 204, an iteration loop is begun to iterate through each of the breakpoints of the atomic set 126. Thus, at block 206, the code block of the target program that contains the breakpoint location of the currently iterated breakpoint is identified. By way of definition, a code block refers to a section of code that can be treated as a whole such that the entirety can be replaced with an alternatively configured version without affecting other aspects of the overall target program. Examples of code blocks of a target program include a function or a method. Entire modules may also be considered code blocks. Of course, it is advantageous to identify the smallest set of code as a code block that can be replaced with an alternatively configured version that also does not affect other code blocks within the target program.

At block 208, the code corresponding to the identified code block is recompiled without code optimizations. Those skilled in the art will appreciate that code optimizations often result in rearranged executable code that, while on the entirety represents the desired results of the code block (as described in the programming source code), does not map well to individual lines/elements of the programming source code. Removing optimizations include, by way of illustration and not limitation, the suppression of native compilation (especially when the target program is generated in an IL or intermediate form for execution/interpretation by an execution engine or common language runtime (CLR) engine), forcing inclusion of so-called "tail calls" within a code block (as tail calls are often optimized out of code blocks), the suppression of in-lined expressions, the suppression of sub-expression elimination, and the like. Of course, as will also be appreciated by those skilled in the art, breakpoints are typically associated with lines of programming code and mapped to actual non-optimized executable code within the target program. Thus, removing optimizations also implies that sequencing information and/or sequence points, i.e., information by which a line of source code can be related to a set of executable instructions in the target program, is included in the recompiled target program.

In regard to compiling the identified code block(s) and according to aspects of the disclosed subject matter, in a first embodiment the entire target program is recompiled with optimizations turned off for those identified code blocks where a breakpoint will be added (including conditional code and a call to a snapshot generator). Alternatively, a compiler may be utilized to recompile only those identified code blocks (without optimizations) and bound to the remainder of the target program. In one embodiment, a just-in-time compiler may be utilized to recompile all or some of the target program, including the identified code block(s).

At block 210, the execution point/location within the corresponding to the currently iterated breakpoint is identified. At block 212, code for generating a snapshot of program/debugging information is inserted at the identified location, i.e., the execution location corresponding to the currently iterated breakpoint. According to various embodiments of the disclosed subject matter, this inserted code may correspond to a set of executable instructions that capture the desired program information and store the captured information as a snapshot corresponding to the current breakpoint. Alternatively, the inserted code may correspond to a function/routine call to another code block within the target program that carries out the snapshot generation and returns back to execute additional instructions of the recompiled code block. As yet another alternative, a function/routine call to another program or service may be made. Irrespective of the actual mechanism implemented, at block 212 the code for generating a snapshot is inserted in/or as part of the recompiled code block.

In addition to inserting the snapshot generation code, at block 214 the snapshot generation code is conditioned according to the conditional information associated with the atomic set of breakpoints. More particularly, the breakpoint is conditioned according to information regarding a logical execution context. As indicated above, conditioning a breakpoint may comprise conditioning the execution of the snapshot generation code according to one or more of a context identifier, a user identifier or URI, demographic information, program-related information, domain information, and the like. Of course, in addition to conditioning the breakpoint according to an execution context, other conditioning factors relating to the breakpoint may also be applied. Conditioning the snapshot generation code implies that the snapshot generation code is executed only upon satisfaction of the conditioning criteria associated with the breakpoint, and particularly the execution context criteria.

As will be appreciated, recompiling the code block may include the insertion of the snapshot generation code as well as the conditioning of the snapshot generation code. Accordingly, while routine 200 appears to illustrate that the insertion of the snapshot generation code is implemented after the recompilation of the code block, and that the snapshot generation code is conditioned after the recompilation of the code block this itemization of the various steps is for illustration and descriptive purposes only, and should not be viewed as limiting upon the disclosed subject matter. Indeed, typically though not exclusively, the recompilation of the code block will include the insertion of the snapshot generator code as well as code implementing the conditions for calling the snapshot generation code.

At block 216, after having recompiled the code block containing the breakpoint location of the currently iterated breakpoint, if there are additional breakpoints of the atomic set of breakpoints to process, the routine 200 returns again to block 204 where the next breakpoint in the iteration loop is selected and the steps described above are repeated. Alternatively, when there are no additional breakpoints to process, the routine 200 proceeds to block 218. At block 218, the various re-compiled code blocks are bound or linked into the target program. Thereafter, the routine 200 terminates.

While the discussion of routine 200 above has been generally directed to a programmer/user establishing a breakpoint in the target program, executing the target program and generating a snapshot of debugger information upon encountering the breakpoint (upon satisfying the execution context condition), it should be appreciated that the principles described above may be similarly applied to the debugging notion of "stepping," i.e., stepping through execution of the target program, line by line, according to each line of source code. Indeed, a code block may be recompiled such that a snapshot or some other form of tracing is generated for each line of source code, each conditioned according to execution context data. Moreover, each breakpoint may be further conditioned according to whether or not stepping is desired.

Figure 3:
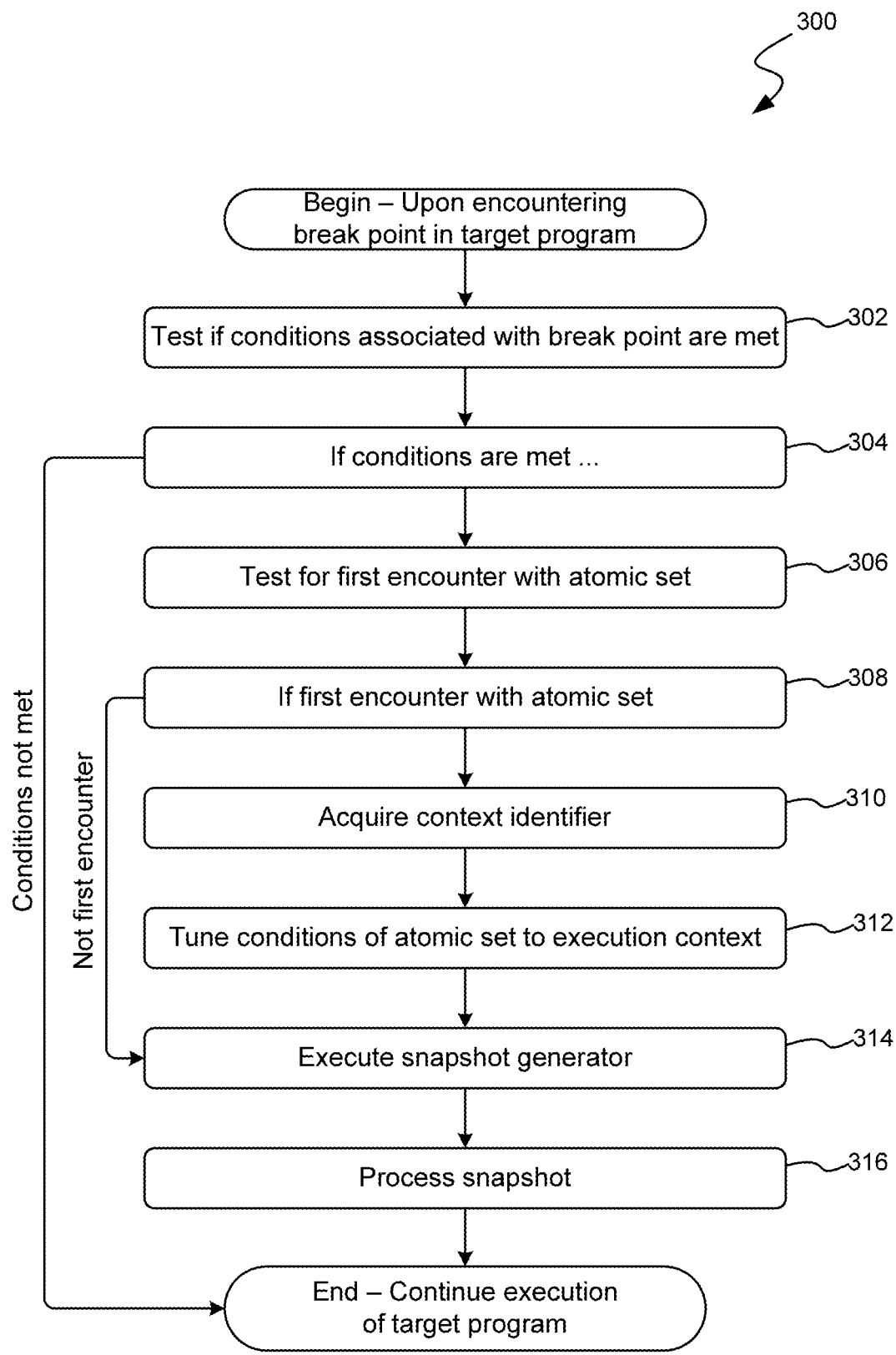
FIG. 3 is a flow diagram illustrating an exemplary routine 300 with regard to the encounter of a breakpoint, conditioned according to logical execution context information, during execution of the target program.

In regard to the triggering of a breakpoint during execution, reference is now made to FIG. 3. Indeed, FIG. 3 is a flow diagram illustrating an exemplary routine 300 with regard to the encounter of a breakpoint, conditioned according to logical execution context information, during execution of the target program. This routine "begins" in the course of execution of the target program, and particularly upon encountering a breakpoint. While typical "breakpoints" may cause a suspension of execution of the target program, as indicated above the breakpoints of the disclosed subject matter are non-blocking such that execution is not paused.

At block 302, in continued execution of the target program, such as target program 122, a test is conducted to determine whether the conditions associated with the current breakpoint are met. As discussed above, these conditions include determining whether the conditions regarding the logical execution context are satisfied. Additionally, there may be varied and/or combined to form a desired set of criteria upon which a snapshot of debugging/program information is generated. At block 304, if the conditions associated with the encountered breakpoint are met, processing continues to block 306. Alternatively, if the conditions associated with the breakpoint are not met, the routine 300 "terminates." Of course, as already suggested, termination of this routine 300 simply implies that execution of the target program continues, without generating the snapshot of program information.

Regarding testing whether the conditions associated with the breakpoint are met, it may be that a server-side target program may be called by many distinct users, some of which will have the necessary attributes to satisfy the conditions initially established with the breakpoints of the atomic set of breakpoints. While conditional execution context criteria are initially established that potentially multiple parties could satisfy, once any one of the breakpoints of an atomic set is initially triggered, all breakpoints of the atomic set are then "tuned" to trigger only on the logical execution context of the first user that triggers any of the breakpoints.

Tuning the breakpoints of the atomic set of breakpoints to trigger only by the first encountered execution context is described below in regard to blocks 308-312. The "test" recited of blocks 302/304 should be viewed as testing for an initial triggering of any breakpoint of an atomic set, as well as subsequent triggering of any breakpoint within the atomic set of breakpoints.

If the conditions regarding the encountered breakpoint are met, at block 306 a test with regard to whether this is the first time that any of the breakpoints in atomic set of breakpoints has been triggered/encountered. At block 308, if this is the first time, that any of the breakpoints in atomic set of breakpoints has been triggered/encountered, processing proceeds to block 310, as will be described below. Alternatively, processing continues at block 314.

According to various embodiments of the disclosed subject matter, at block 310, as this is the first time that any of the breakpoints of the atomic set of breakpoints is encountered, the context identifier of the logical execution context is obtained. In one embodiment, utilizing the context identifier of the logical execution context allows for unique identification of the logical execution context to the exclusion of others, while permitting the identification of multiple threads and/or processes that may occur in the course of executing the target program. Of course, the context identifier of the logical execution context is an example of one embodiment by which a logical execution context may be identified, to the exclusion of others, and it is anticipated that other means and/or identifiers may alternatively be used.

At block 312, the conditions related to all breakpoints of the atomic set of breakpoints are tuned according to the context identifier (or other identification mechanisms that may be utilized). In tuning (i.e., updating the conditions upon which the breakpoints of the atomic set of breakpoints will trigger) the breakpoints of an atomic set ensures that the breakpoints (in the atomic set) submitted by a programmer all trigger upon the same condition once a suitable logical execution context is identified (i.e., meets the initial conditions associated with the atomic set of breakpoints).

At block 314 and in the course of execution of the target program, the code regarding the snapshot generation is executed, resulting in a snapshot of the program at the current breakpoint. At block 316, the snapshot is processed, which may include initiating an asynchronous thread to store and forward the snapshot to the programmer 101. Thereafter, the routine 300 "terminates," which in this case means that the target program continues its execution in its normal course.

Regarding routines 200 and 300 described above, as well as other processes that may be described herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the routines and/or processes include various novel features of the disclosed subject matter, other steps (not listed) may also be included and carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 5 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 4:
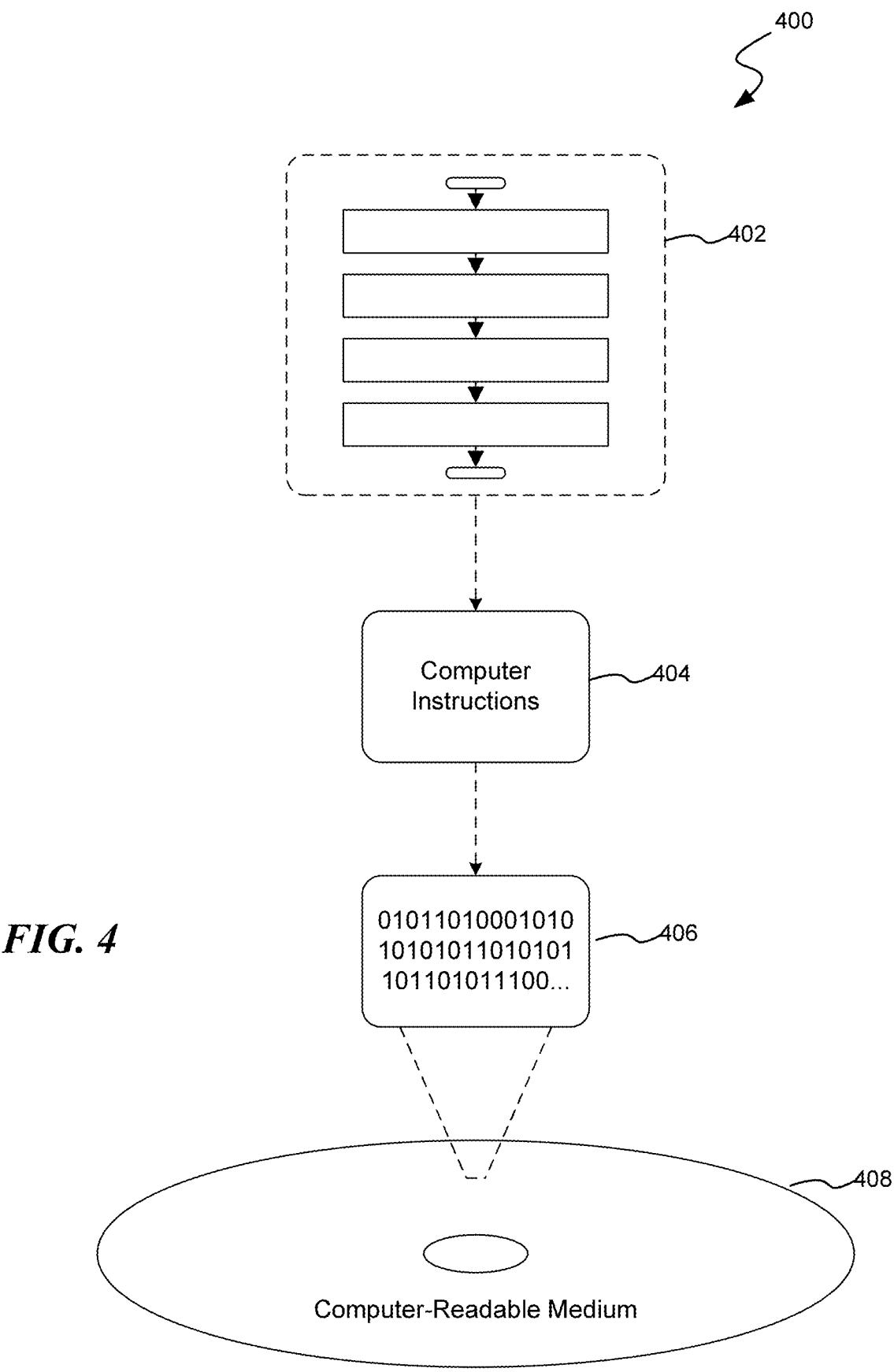
FIG. 4 is a block diagram illustrating an exemplary computer readable medium encoded with instructions.

Regarding computer readable media, FIG. 4 is a block diagram illustrating an exemplary computer readable medium encoded with instructions, such as instructions for setting breakpoints in a target program, or in encountering a breakpoint during execution of the target program, as described above. More particularly, the implementation 400 comprises a computer-readable medium 408 (e.g., a CD-R, DVD-R or a platter of a hard disk drive), on which is encoded computer-readable data 406. This computer-readable data 406 in turn comprises a set of computer instructions 404 configured to operate according to one or more of the principles set forth herein. In one such embodiment 402, the processor-executable instructions 404 may be configured to perform a method, such as at least some of exemplary method 100 or 200, for example. In another such embodiment, the processor-executable instructions 404 may be configured to implement a system on a computing device, such as at least some of the exemplary, executable components of system 500, as described below. Many such computer readable media may be devised, by those of ordinary skill in the art, which are configured to operate in accordance with the techniques presented herein.

Figure 5:
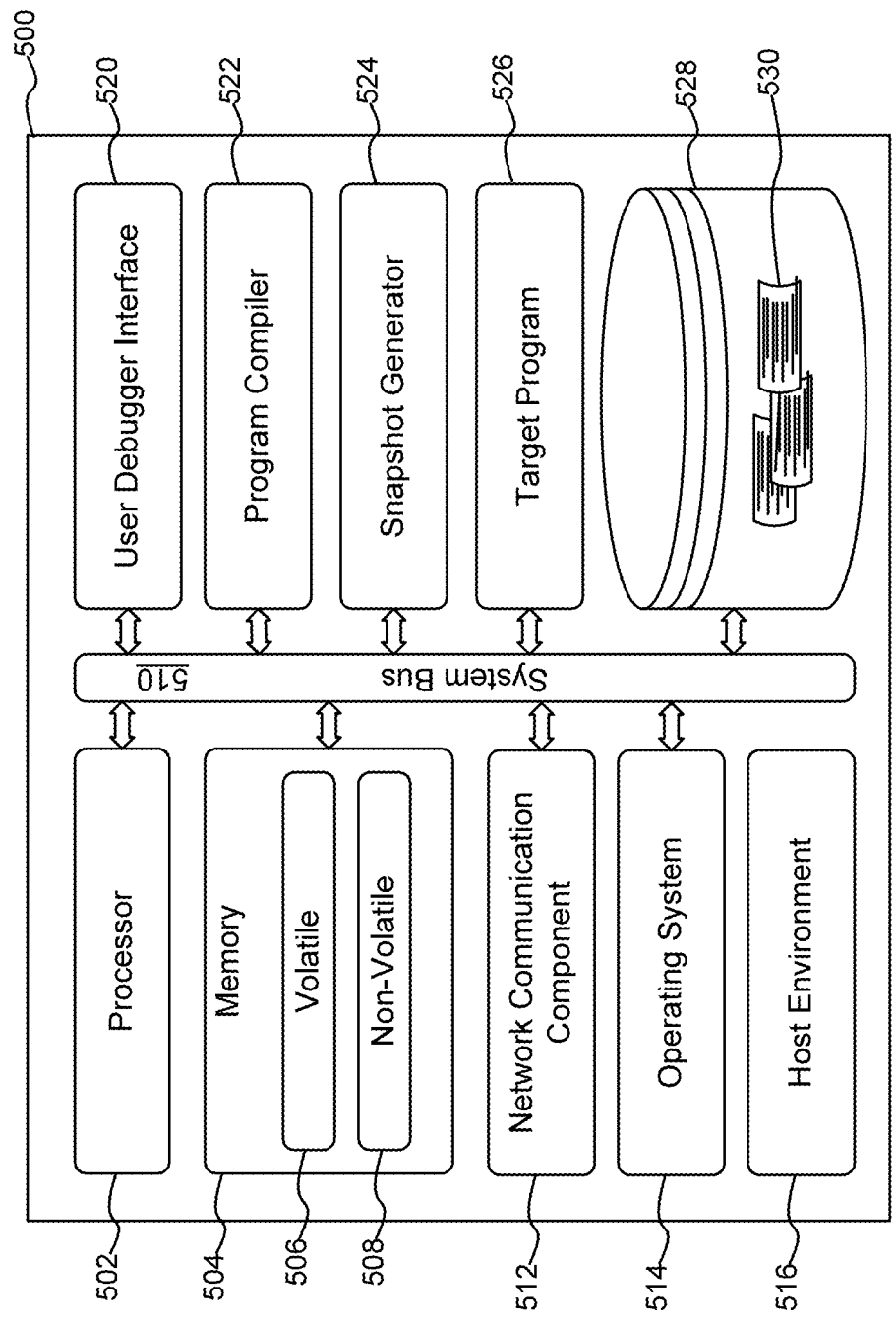
FIG. 5 is a block diagram of an exemplary server-side computer 500 suitable for implementing aspects of the disclosed subject matter.

Turning now to FIG. 5, FIG. 5 is a block diagram of an exemplary server-side computer 500 suitable for implementing aspects of the disclosed subject matter. In particular, the server-side computer 500 is configured to interact with a programmer/user in setting breakpoints in a target program and in providing snapshots regarding various encountered breakpoints in the target program to the programmer, as described in regard to FIG. 1. The exemplary server-side computer 500 includes one or more processors (or processing units), such as processor 502, and further includes at least one memory 504. The processor 502 and memory 504, as well as other components, are interconnected by way of a system bus 510.

As will be appreciated by those skilled in the art, the memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 6506 whereas ROM, solid-state memory devices, memory storage devices, and/or memory cards are examples of non-volatile memory 508.

As will also appreciated by those skilled in the art, the processor 502 executes instructions retrieved from the memory 504 (and/or from computer readable media, such as computer readable media 400 of FIG. 4) in carrying out various functions of performing the processing of breakpoints, recompiling code blocks, and the like. The processor 502 may be comprised of any of a number of available processors such as single-processor, multi-processor, single-core units, and multi-core units.

Further still, the illustrated server-side computer 500 includes a network communication component 512 for interconnecting this computing device with other devices and/or services over a computer network, such as network 110 of FIG. 1. The network communication component 512, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

In addition to the various component identified above, the exemplary server-side computer further includes an operating system 514 that provide system software for the server-side computer that manages both hardware and software resources of the computer. As will be appreciated by those skilled in the art, the operating system also provides a common set of services for the execution of computer programs and other executable modules on the server-side computer 500.

Still further included in the server-side computer 500 is a user debugger interface 520. In execution, the user debugger interface 520 interacts with a user/programmer (or, more particularly, with the debugger execution on the user computing device at the direction of the programmer) in receiving breakpoints, setting those breakpoints in the target program, and transmitting generated snapshots (as a result of the various breakpoints being triggered) back to the programmer's debugger for debugging purposes.

In conjunction with the user debugger interface 520 a program compiler 522, in execution, is employed to recompile the target program, and particular recompile identified code blocks that contain breakpoint locations, as described above. Further still, a snapshot generator 524, in execution, captures program/debugger information based on the execution state of the target program at an encountered breakpoint. Of course, the code for generating snapshots could, alternatively, be included in the target program. Accordingly, the inclusion of the snapshot generator 524 as part of the server-side computer 500 should be viewed as a non-limiting embodiment.

Still further, the server-side computer 500 may optionally include one or more executable applications, such as target program 526. Also, the server-side computer 500 includes a data store 528 in which generated snapshots, such as snapshot 530, may be stored.

Regarding the various components of the exemplary server-side computer 500, those skilled in the art will appreciate that many of these components may be implemented as executable software modules stored in the memory of the computing device, as executable hardware modules and/or components (including SoCs—systems on a chip), or a combination thereof. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

Moreover, in certain embodiments each of the various components of the exemplary server-side computer 500 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network as in known in the art.

One of the promises of a cloud debugger is that of minimal impact to the performance of the server. One aspect of this promise is that code running on the server is fully optimized and does not require a specific debug build of a target application to be utilized in order to be debugged. Of course, fully-optimized code is significantly harder to debug as optimizations transform a program in order to achieve the best performance for execution, not debug-ability. For example, in optimized code, interesting values may be eliminated or combined into other expressions. Similarly, functions maybe in-lined into other code, and/or tail calls may be entirely removed from a particular code block. In short, optimizations can cause confusion for the developer and/or simply make various aspects of a program inaccessible during debugging.

As discussed above and according to aspects of the disclosed subject matter, a cloud debugger temporarily disables (or causes the disabling of) optimizations of code blocks of a target program to enhance the ability to debug that particular code block. Temporarily disabling optimizations includes "undoing" constant propagations, loop unrolling, in-lining etc. It also means injecting sequence points back into the impacted code block at the point of the breakpoint to ensure that the various values and states accurately reflect the desires position (as determined by the source code). Also, and in accordance will additional aspects of the disclosed subject matter, once a breakpoint has hit/encountered, or once a breakpoint is removed because the cloud debugging session has ended, optimizations can be reapplied to the impacted code block.

Figure 6:
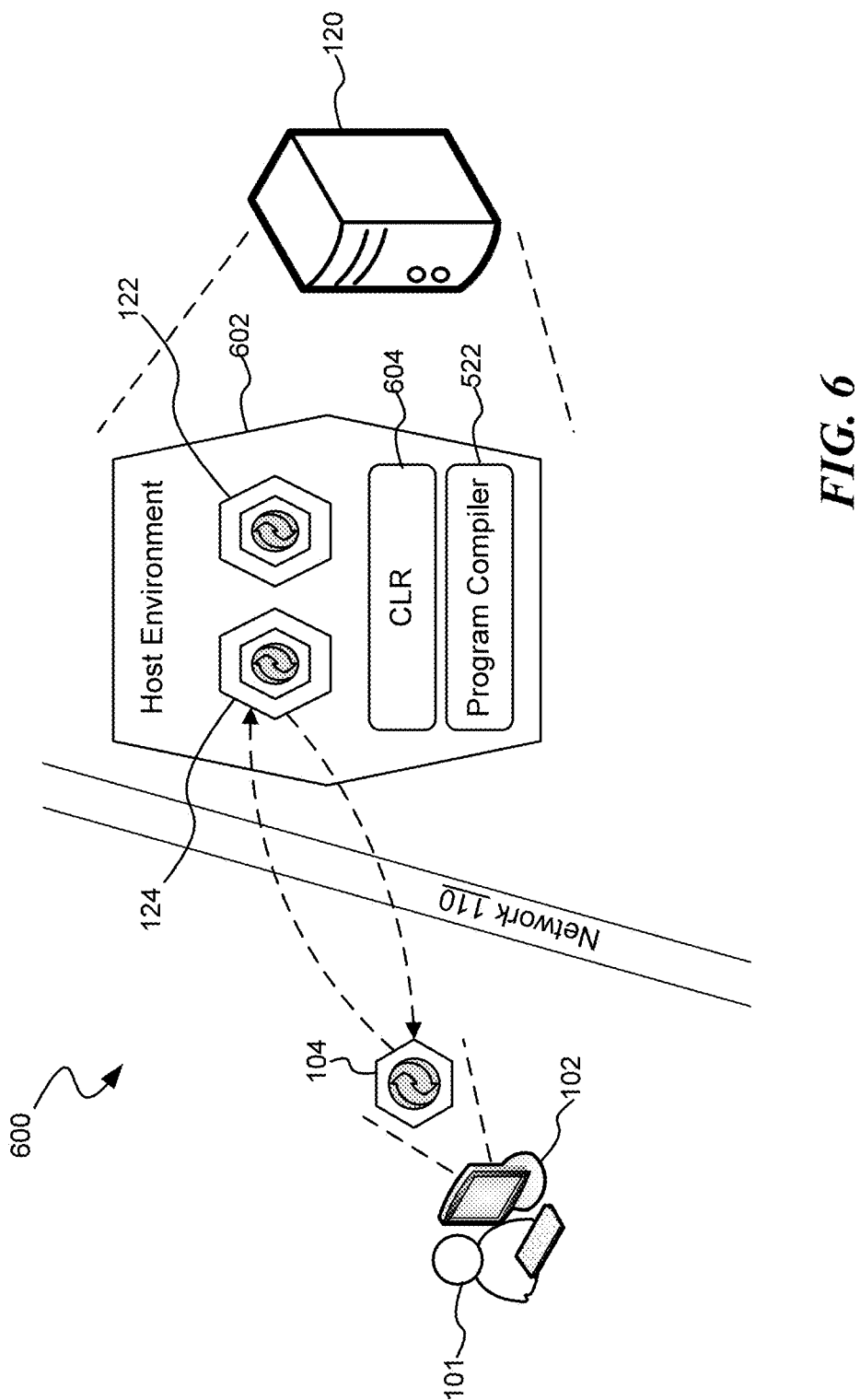
FIG. 6 is a block diagram suitable for describing an embodiment of the disclosed subject matter operating in an exemplary network environment 600 with regard to temporarily disabling optimizations in a target function or code block.

Turning to FIG. 6, FIG. 6 is a block diagram suitable for describing an embodiment of the disclosed subject matter operating in an exemplary network environment 600 with regard to temporarily disabling optimizations in a target function or code block. The network environment 600 includes a user/programmer 101 utilizing a computer 102 to debug a server-side target program 122, where the target program is "under load."

According to the illustrated embodiment, the target program operates in a host (or hosted) environment 602 that executes on a server computer 120. A hosted environment is an environment in which executable code relies upon an existing framework to execute. For example, in the illustrated network environment 600, the framework is represented by the Common Language Runtime (CLR) 604 module. By way of illustration and not limitation, the host environment 602 may correspond to a .Net framework as provided by Microsoft Corporation. Moreover, the target program 122 may be compiled to an "il" file, i.e., an intermediate language file that is executed by a Common Language Runtime (CLR) 604 module of the .Net framework. As those skilled in the art will appreciate, a program compiler, such as program compiler 522, converts source code and generates an output. In some instances, the output is machine executable code while in other instances the output is intermediate code, such as the "il" file, that is executed on a computer by way of an execution module, such as the CLR 604. In either case, most program compilers, such as program compiler 522, are sophisticated such that optimizations can be performed to aid in execution throughput of the executable program. As these optimizations may include in-lining, loop optimizations, tail call elimination from routines, constant propagation, sub-routine elimination, and the like.

Almost all optimizations result in code that doesn't track well to the source code. Thus, when a programmer wishes to debug a section of code, optimizations must be turned off with respect to the code block that is the target of the debugging. While an up-optimized version of a target program can be generated, currently this requires the termination of the optimized target program, to be replaced by an un-optimized target program, which un-optimized target program may run substantially slower. To address this issue and according to aspects of the disclosed subject matter, instead of replacing the optimized target program with an un-optimized target program, just-in-time compiling and binding techniques may be used. More particularly, when a server-side debugging module, such as debugging module 124, receives a request from a debugger, such as debugger 104, to place a breakpoint (such as the execution context-conditioned breakpoints discussed above) in a code block, the debugger determines whether or not the target code block is un-optimized and, if not, performs a just-in-time un-optimized compilation of the code block (which also includes sequence information) that includes breakpoint information as described above, and binds the un-optimized code with the other components of the target program.

According to aspects of the disclosed subject matter, in addition to simply re-compiling the various code blocks without optimizations, often it may be necessary to identify additional modules and/or code blocks that have been optimized in some manner that is related to the optimizations that have been disabled to an identified code block. For example, when a function $f(\ )$ is optimized in compilation such that it is replace with in-line processing, other functions that include a call to the optimized function $f(\ )$ are optimized with the in-line version of that optimized function. Accordingly, when the code block that includes function $f(\ )$ is compiled without optimizations, it is necessary to also "update" those other functions that have been optimized with an in-line version. Otherwise, the de-optimized function $f(\ )$ may never be called. By way of illustration and not limitation, In-lining, tail function calls, constant propagation, and the like are examples of optimizations that may be reflected in other code blocks and that need to be "undone" in order to have a target program with the identified code block un-optimized. Additionally and according to aspects of the disclosed subject matter, while the code blocks that contain these other functions and/or routines must be updated to remove optimizations that were propagated from an optimized code block, it may not be necessary to completely recompile all of these other code blocks without optimizations, but rather recompile them in such a manner that optimizations of the identified code block are not reflected in their recompilation, irrespective of other optimizations that may be applied. In short, in some instances, re-compiling a code block without optimizations may require that other code blocks are also re-compiled to an extent that optimizations of specific sets of code that are eliminated in the identified code block are also eliminated in other code blocks. Conversely, when a breakpoint (or multiple breakpoints of an atomic set) is cleared in an identified code block, not only is the identified code block re-compiled with optimizations restored, but the other code blocks that have been re-compiled to reflect the elimination of optimizations of the identified code block, must also be recompiled with the optimizations restored, and rebound into the target program.

While the binding of the target program may require that the target program be taken off-line for a period of time, an advantage is still realized in that only the targeted code block is recompiled, and only that code block need be compiled without optimizations. Conversely, when the breakpoint is to be removed, the targeted code block can be recompiled (in the just-in-time manner) with optimizations and without conditioned breakpoint instructions, and bound with the other modules of the target program.

While just-in-time (JIT) compiling is readily utilized in host environments like the .Net framework from Microsoft, similar techniques may be utilized for other host environments (e.g., JavaScript, Java, and the like) as well as in non-host (or non-hosted) environments in which native code executables execute without a base framework or CLR. Indeed, with regard to a native code executable, a target output module (that includes the target code block) may be recompiled without optimizations and with the conditioned breakpoint calls when a breakpoint is to be set in the target code block, and the recompiled module may be bound/linked with the other output modules of the target program.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for processing a breakpoint request regarding a target program, the method comprising:
   receiving breakpoint information identifying an execution location in a target program executing on a computing device to set a first breakpoint and a condition for triggering the first breakpoint, the target program comprising optimized server-side production code that does not map to individual lines and elements of associated source code;
   identifying a code block of the target program that includes the execution location of the first breakpoint;
   re-compiling the code block of the target program, wherein re-compiling the code block of the target program comprises:
      re-compiling the code block without optimizations, re-compiling without optimizations including suppressing native compilation, forcing inclusion of tail calls, suppressing in-lined expressions, and suppressing sub-expression elimination;
      including information by which lines of source code for the code block can be related to executable instructions in the re-compiled code block; and
      including executable instructions at the execution location that, when executed, generate a snapshot of debugger information regarding the target program upon the first breakpoint triggering and, after execution, return control to the target program such that processing resumes at the point of the target program immediately after the execution location, the executable instructions being configured such that the first breakpoint is triggered upon both execution of the target program reaching the execution location and satisfaction of the specified condition; and
   binding the re-compiled code block in the target program such that the re-compiled code block is substituted for the previous optimized server-side production code of the code block and, when executed, the target program executes the optimized server-side production code but upon entering the code block, executes the re-compiled non-optimized code of the code block.

2. The computer-implemented method of claim 1 further comprising:
   receiving information to remove the first breakpoint from the target program;
   re-compiling the code block corresponding to the first breakpoint of the target program without optimizations; and
   binding the optimized re-compiled code block in the target program.

3. The computer-implemented method of claim 1, wherein the breakpoint information identifies an atomic set of breakpoints to be set in the target program, the atomic set of breakpoints comprising a plurality of breakpoints including the first breakpoint.

4. The computer-implemented method of claim 3, wherein each of the plurality of breakpoints of the atomic set of breakpoints corresponds to a distinct execution location in the target program.

5. The computer-implemented method of claim 4 further comprising:
   for each breakpoint of the plurality of breakpoints:
      determining an execution location of a breakpoint;
      identifying a code block of the target program including the determined execution location of the breakpoint;
      re-compiling the identified code block of the target program, wherein re-compiling the identified code block comprises:
         re-compiling the identified code block without optimizations; and
         including executable instructions at the determined execution location to generate a snapshot of debugger information regarding the target program upon the breakpoint triggering; and
      binding the re-compiled code blocks in the target program.

6. The computer-implemented method of claim 5 further comprising:
   setting each breakpoint of the atomic set of breakpoints at its corresponding execution location of the breakpoint, and wherein setting each breakpoint at the corresponding execution location comprises:
      setting each breakpoint in a manner that that does not block execution of the target program upon triggering the breakpoint; and
      including instructions in the target program to generate a snapshot of debugger information regarding the target program upon the breakpoint triggering.

7. The computer-implemented method of claim 6 further comprising:
   receiving information to remove the plurality of breakpoints of the atomic set of breakpoints from the target program;
   identifying the code blocks of each of the plurality of breakpoints of the atomic set of breakpoints;
   for each identified code block, re-compiling the identified code block with optimizations; and
   binding the optimized re-compiled code blocks in the target program.

8. The computer-implemented method of claim 7, wherein the target program executes in a hosted environment.

9. The computer-implemented method of claim 7, wherein the target program executes as native code.

10. A computer-readable medium bearing computer-executable instructions which, when executed on a computer comprising at least a processor, carry out a method for processing a breakpoint request regarding a target program, the method comprising:
   receiving breakpoint information identifying an execution location in a target program executing on a computing device to set a first breakpoint and a condition for triggering the first breakpoint, the target program comprising optimized server-side production code that does not map to individual lines and elements of associated source code;
   identifying a code block of the target program including the execution location of the first breakpoint;
   re-compiling the code block of the target program, wherein re-compiling the code block of the target program comprises:
      re-compiling the code block without optimizations, re-compiling without optimizations including suppressing native compilation, forcing inclusion of tail calls, suppressing in-lined expressions, and suppressing sub-expression elimination;
      including information by which lines of source code for the code block can be related to executable instructions in the re-compiled code block; and
      including executable instructions at the execution location that, when executed, generate a snapshot of debugger information regarding the target program upon the first breakpoint triggering and, after execution, return control to the target program such that processing resumes at the point of the target program immediately after the execution location, the executable instructions being configured such that the first breakpoint is triggered upon both execution of the target program reaching the execution location and satisfaction of the specified condition; and
   binding the re-compiled code block in the target program such that the re-compiled code block is substituted for the previous optimized server-side production code of the code block and, when executed, the target program executes the optimized server-side production code but upon entering the code block, executes the re-compiled non-optimized code of the code block.

11. The computer-readable medium of claim 10, wherein the method further comprises:
   receiving information to remove the first breakpoint from the target program;
   re-compiling the code block corresponding to the first breakpoint of the target program without optimizations; and
   binding the optimized re-compiled code block in the target program.

12. The computer-readable medium of claim 10, wherein the breakpoint information identifies an atomic set of breakpoints to be set in the target program, the atomic set of breakpoints comprising a plurality of breakpoints including the first breakpoint.

13. The computer-readable medium of claim 12, wherein each of the plurality of breakpoints of the atomic set of breakpoints corresponds to a distinct execution location in the target program.

14. The computer-readable medium of claim 13, wherein the method further comprises:
   for each breakpoint of the plurality of breakpoints:
      determining an execution location of a breakpoint;
      identifying a code block of the target program including the determined execution location of the breakpoint;
      re-compiling the identified code block of the target program, wherein re-compiling the identified code block comprises:
         re-compiling the identified code block without optimizations; and
         including executable instructions at the determined execution location to generate a snapshot of debugger information regarding the target program upon the breakpoint triggering; and
      binding the re-compiled code blocks in the target program.

15. The computer-readable medium of claim 14, wherein the method further comprises:
   setting each breakpoint of the atomic set of breakpoints at its corresponding execution location of the breakpoint, and wherein setting each breakpoint at the corresponding execution location comprises:
      setting each breakpoint in a manner that that does not block execution of the target program upon triggering the breakpoint; and
      including instructions in the target program to generate a snapshot of debugger information regarding the target program upon the breakpoint triggering.

16. The computer-readable medium of claim 15, wherein the method further comprises:
   receiving information to remove the plurality of breakpoints of the atomic set of breakpoints from the target program;
   identifying the code blocks of each of the plurality of breakpoints of the atomic set of breakpoints;
   for each identified code block, re-compiling the identified code block with optimizations; and
   binding the optimized re-compiled code blocks in the target program.

17. A computer device for processing breakpoint requests regarding a target program, the system comprising a processor and a memory, wherein the processor executes instructions stored in the memory as part of or in conjunction with one or more additional executable components that, in execution, configure the computer device to:
   receive an atomic set of breakpoints, the atomic set of breakpoints identifying one or more breakpoints to be set in a target program, each of the one or more breakpoints corresponding to an execution location in the target program and a condition for triggering the each breakpoint, the target program comprising optimized server-side production code that does not map to individual lines and elements of associated source code;
   for each of the one or more breakpoints of the atomic set of breakpoints, identify a code block of the target program that includes the execution location of the corresponding breakpoint;
   re-compile each identified code block of the target program, wherein re-compiling each identified code block of the target program comprises:
      re-compiling each identified code block without optimizations, re-compiling without optimizations including suppressing native compilation, forcing inclusion of tail calls, suppressing in-lined expressions, and suppressing sub-expression elimination;
      including information by which lines of source code for the each code block can be related to executable instructions in the re-compiled each code block; and including executable instructions at the execution location of the breakpoint that, when executed, generate a snapshot of debugger information regarding the target program upon the breakpoint triggering and, after execution, return control to the target program such that processing resumes at the point of the target program immediately after the execution location, the executable instructions being configured such that the breakpoint is triggered upon both execution of the target program reaching the execution location and satisfaction of the specified condition; and binding the re-compiled identified code blocks in the target program such that the re-compiled identified code block is substituted for the previous optimized server-side production code of the code block and, when executed, the target program executes the optimized server-side production code but upon entering the code block, executes the re-compiled non-optimized code of the code block.

18. The computer device of claim 17, wherein the computer device is further configured to:

set each of the one or more breakpoints of the atomic set of breakpoints at a corresponding execution location of a breakpoint, and wherein setting each breakpoint at a corresponding execution location comprises:

setting a breakpoint in a manner that that does not block execution of the target program upon triggering the breakpoint; and including instructions in the target program to generate a snapshot of debugger information regarding the target program upon the breakpoint triggering.

19. The computer device of claim 18, wherein the computer device is further configured to:

receive information to remove the plurality of breakpoints of the atomic set of breakpoints from the target program;

identify the code blocks of each of the plurality of breakpoints of the atomic set of breakpoints;

for each identified code block, re-compile the identified code block with optimizations; and bind the optimized re-compiled code blocks in the target program.

20. The computer device of claim 19, wherein the target program executes in a hosted environment.

\* \* \* \* \*